United States Patent
Puig

(10) Patent No.: US 12,434,518 B2
(45) Date of Patent: Oct. 7, 2025

(54) ELECTRICAL CONNECTOR SYSTEMS AND METHODS FOR MOVABLE COMPONENT

(71) Applicant: GM GLOBAL TECHNOLOGY OPERATIONS LLC, Detroit, MI (US)

(72) Inventor: Carla P. Puig, Azusa, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 707 days.

(21) Appl. No.: 17/929,134

(22) Filed: Sep. 1, 2022

(65) Prior Publication Data

US 2024/0075777 A1 Mar. 7, 2024

(51) Int. Cl.
*B60D 1/64* (2006.01)

(52) U.S. Cl.
CPC ...................... *B60D 1/64* (2013.01)

(58) Field of Classification Search
CPC ....................................................... B60D 1/64
USPC ......................................................... 320/109
See application file for complete search history.

(56) References Cited

U.S. PATENT DOCUMENTS

| | | | |
|---|---|---|---|
| 11,466,496 B2* | 10/2022 | Shin | E05D 15/165 |
| 11,701,981 B2* | 7/2023 | Freeling-Wilkinson | B60L 53/14 |
| | | | 320/109 |
| 11,745,606 B2* | 9/2023 | Schoob | B60L 53/37 |
| | | | 320/109 |
| 2009/0141412 A1* | 6/2009 | Hickam | H02H 3/14 |
| | | | 340/653 |
| 2011/0140656 A1* | 6/2011 | Starr | B60L 53/65 |
| | | | 320/109 |
| 2014/0009112 A1* | 1/2014 | Fontana | B60L 53/35 |
| | | | 320/109 |
| 2014/0042964 A1* | 2/2014 | Arabia, Jr. | B60L 53/16 |
| | | | 70/237 |
| 2015/0008873 A1* | 1/2015 | Smith | H02J 7/0045 |
| | | | 320/137 |
| 2015/0137755 A1* | 5/2015 | Sadano | B60L 53/16 |
| | | | 320/109 |
| 2023/0231372 A1* | 7/2023 | Sarraf | B60L 53/16 |
| | | | 320/109 |

FOREIGN PATENT DOCUMENTS

| | | | | |
|---|---|---|---|---|
| CN | 217730224 U | * | 11/2022 | |
| CN | 217918144 U | * | 11/2022 | |
| CN | 115556597 A | * | 1/2023 | ............. B60L 50/64 |
| CN | 218257778 U | * | 1/2023 | |
| CN | 218616411 U | * | 3/2023 | |

(Continued)

*Primary Examiner* — Suresh Memula
(74) *Attorney, Agent, or Firm* — Ingrassia Fisher & Lorenz, LLP | IF&L

(57) ABSTRACT

An electrical connector system for electrically coupling a movable component to a fixed component includes a first connector including a first body and a first door. The first door is movable to expose a first electrical connector disposed within the first body. The electrical connector system includes a second connector including a second body and a second door. The second door is movable to expose a second electrical connector disposed within the second body. The electrical connector system includes an actuator coupled to the second electrical connector. The actuator is configured to move the second electrical connector to couple the second electrical connector to the first electrical connector.

20 Claims, 13 Drawing Sheets

(56) References Cited

FOREIGN PATENT DOCUMENTS

| | | | | | |
|---|---|---|---|---|---|
| CN | 117638576 | A | * | 3/2024 | ............. H01R 43/26 |
| CN | 113753139 | B | * | 4/2025 | ............. B60K 15/05 |
| DE | 102020130235 | A1 | * | 5/2022 | ............... B60K 1/00 |
| DE | 102021123956 | A1 | * | 3/2023 | ............. B60K 15/05 |
| DE | 102021005753 | A1 | * | 5/2023 | ............. B60K 15/05 |
| DE | 102022113349 | A1 | * | 6/2023 | ............. B60K 15/05 |
| DE | 102022102787 | A1 | * | 8/2023 | ........... H01R 3/5213 |
| DE | 102023106545 | A1 | * | 10/2023 | ............. B60K 15/05 |
| DE | 102022117097 | A1 | * | 1/2024 | ............. B60K 15/05 |
| DE | 102022119252 | A1 | * | 2/2024 | ............. B60K 15/05 |
| DE | 112022004539 | T5 | * | 10/2024 | ............. B60L 53/11 |
| EP | 2037545 | A2 | * | 3/2009 | ........... H01R 13/506 |
| EP | 4124489 | A1 | * | 2/2023 | ............. E05B 81/34 |
| JP | 2022152818 | A | * | 10/2022 | |
| KR | 20230153548 | A | * | 11/2023 | ............... B60L 53/16 |
| WO | WO-03035415 | A1 | * | 5/2003 | ........ H01R 13/6315 |
| WO | WO-2008076169 | A1 | * | 6/2008 | ............. H02H 9/042 |
| WO | WO-2025136096 | A1 | * | 6/2025 | ............... H02K 7/14 |

* cited by examiner

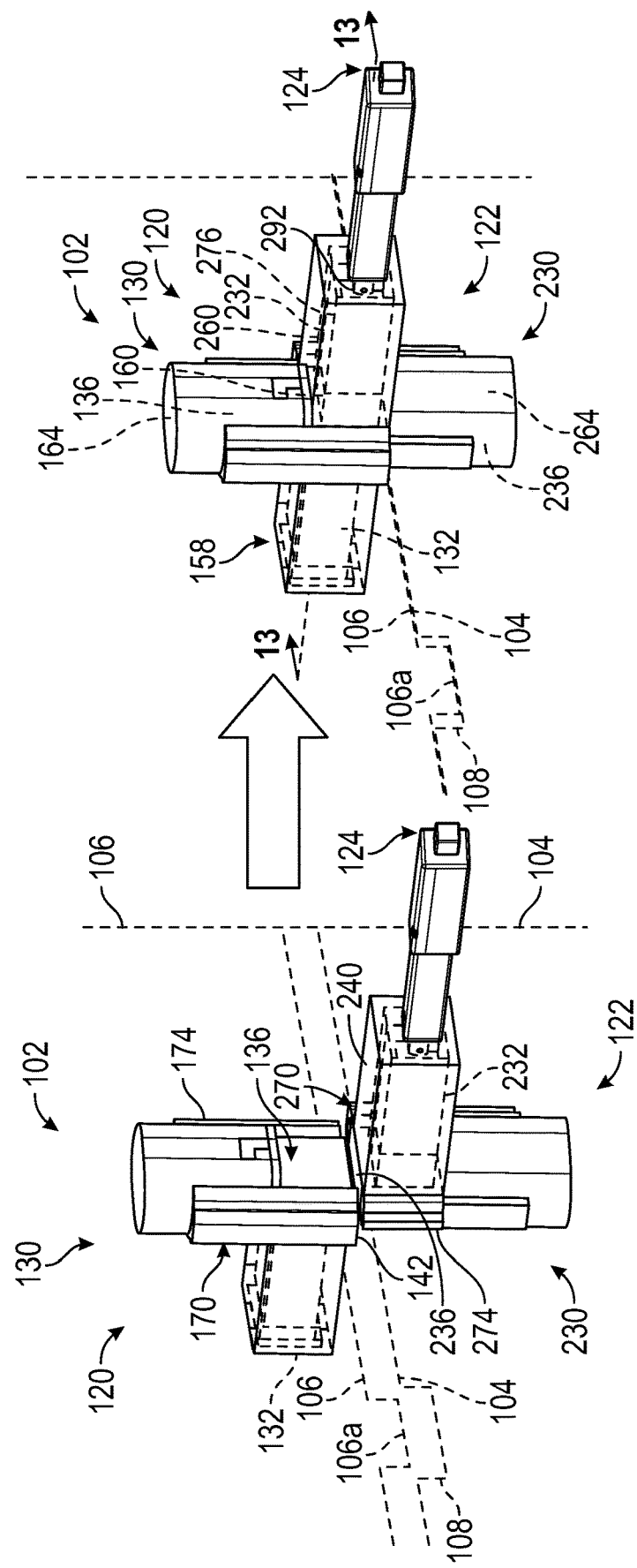

ELECTRICAL CONNECTOR SYSTEMS AND METHODS FOR MOVABLE COMPONENT

INTRODUCTION

The technical field generally relates to electrical connector systems and methods for electrically coupling a movable component to a fixed component, and more particularly relates to electrical connector systems and methods for establishing an electrical connection between a movable component associated with a vehicle and a fixed component associated with a vehicle.

Many vehicles include components that move relative to fixed or stationary components. In certain instances, a movable component may include an electrical fixture, such as a light or the like, to which electrical power is to be supplied via cables that are connected together by an electrical connector. Generally, in order to move the movable component relative to the fixed component, the electrical connector is disconnected by a technician, for example, to enable the movable component to move without damaging the cables. The manual disconnecting of the electrical component is time consuming, and may be overlooked. In addition, if the electrical connector is disconnected and not protected, pins or the like associated with the electrical connector may become exposed to dirt, debris or moisture, which is undesirable.

Thus, it is desirable to provide electrical connector systems and methods for a movable component, which enables the disconnection of an electrical connector between a movable component and a fixed component without requiring a technician or human input. It is also desirable to provide electrical connector systems that also protect the electrical connector once disconnected. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an electrical connector system for electrically coupling a movable component to a fixed component. The electrical connector system includes a first connector including a first body and a first door. The first door is movable to expose a first electrical connector disposed within the first body. The electrical connector system includes a second connector including a second body and a second door. The second door is movable to expose a second electrical connector disposed within the second body. The electrical connector system includes an actuator coupled to the second electrical connector. The actuator is configured to move the second electrical connector to couple the second electrical connector to the first electrical connector.

The first body includes a first guide, the second body includes a second guide rail, and engagement of the first guide of the first body with the second guide rail of the second body is configured to move the first door and the second door to expose the first electrical connector and the second electrical connector. The first guide defines a channel that receives the second guide rail, and the channel has a first cross-section at a first surface of the first body and transitions to a second cross-section a distance from the first cross-section, the second cross-section different than the first cross-section. The second body includes a second receptacle, the second electrical connector is coupled to a connector housing disposed within the second receptacle and the connector housing is slidable relative to the second receptacle by the actuator. The second receptacle is in communication with a second door opening defined in the second body, and the second door is configured to enclose the second receptacle in a first, closed position. The second body includes a second spring housing that is configured to receive a second spring, and the second spring biases the second door into the first, closed position. The connector housing includes a second alignment pin configured to be received within the first body when the first electrical connector is exposed. The first body is configured to move the second door to expose the second electrical connector, and the second body is configured to move the first door to expose the first electrical connector. The first body defines a first receptacle, the first electrical connector is disposed within the first receptacle and is fixed relative to the first receptacle, the first body defines a first door opening in communication with the first receptacle, and the first door is movable relative to the first door opening to expose the first electrical connector. The first electrical connector is a female electrical connector, the second electrical connector is a male electrical connector, and the movable component and the fixed component are each associated with a vehicle.

A method for electrically coupling a movable component to a fixed component, includes providing a first connector including a first body and a first door coupled to the movable component. The first door is movable to expose a first electrical connector disposed within the first body. The method includes providing a second connector including a second body and a second door coupled to the fixed component. The second door is movable to expose a second electrical connector disposed within the second body. The method includes determining, by a processor, whether the movable component is coupled to the fixed component; and based on a determination that the movable component is coupled to the fixed component, outputting one or more control signals to an actuator coupled to the second electrical connector to move the second electrical connector into engagement with the first electrical connector.

The method includes determining whether the movable component is uncoupled from the fixed component; and based on a determination that the movable component is uncoupled from the fixed component, outputting one or more control signals to the actuator coupled to the second electrical connector to retract the second electrical connector to disengage the second electrical connector with the first electrical connector. The determining whether the movable component is coupled to the fixed component includes providing a latch on the fixed component configured to receive a striker coupled to the movable component; observing a state of the latch by a latch feedback sensor and generating sensor signals based on the observing; and determining, by the processor, whether the latch is in a latched state in which the movable component is coupled to the fixed component or an unlatched state in which the movable component is uncoupled from the fixed component based on the sensor signals. The method includes outputting one or more control signals to the actuator to disengage the second electrical connector with the first electrical connector based on the determining the latch is in the unlatched state.

Also provided is an electrical connector system for electrically coupling a movable component to a fixed component. The electrical connector system includes a first connector configured to be coupled to the movable component. The first connector including a first body and a first door, and the first door is movable to expose a first electrical connector disposed within the first body. The first body includes a first guide disposed on a first side of the first body. The electrical connector system includes a second connector configured to be coupled to the fixed component so as to be aligned with the first connector about a longitudinal axis that extends along the first connector and the second connector. The second connector includes a second body and a second door, and the second door is movable to expose a second electrical connector disposed within the second body. The second body includes a second guide rail defined on a second side of the second body. The engagement of the first guide of the first body and the second guide rail of the second body is configured to move the first door and the second door to expose the first electrical connector and the second electrical connector. The electrical connector system includes an actuator coupled to the second electrical connector. The actuator is configured to move the second electrical connector to couple the second electrical connector to the first electrical connector when the first electrical connector and the second electrical connector are exposed.

The first guide defines a channel that receives the second guide rail, and the channel has a first cross-section at a first end of the first body and transitions to a second cross-section a distance from the first cross-section, and the second cross-section different than the first cross-section. The second body includes a second receptacle, the second electrical connector is coupled to a connector housing disposed within the second receptacle and the connector housing is slidable relative to the second receptacle by the actuator. The second receptacle is in communication with a second door opening defined in the second body, and the second door is configured to enclose the second receptacle in a first, closed position. The second body includes a second spring housing that is configured to receive a second spring, and the second spring biases the second door into the first, closed position. The first body defines a first receptacle, the first electrical connector is disposed within the first receptacle and is fixed relative to the first receptacle, the first body defines a first door opening in communication with the first receptacle, the first door is movable relative to the first door opening to expose the first electrical connector and the movable component and the fixed component are each associated with a vehicle.

BRIEF DESCRIPTION OF THE DRAWINGS

The exemplary embodiments will hereinafter be described in conjunction with the following drawing figures, wherein like numerals denote like elements, and wherein:

FIG. 11 is a schematic perspective view of the first connector, the second connector and the actuator, in which the first connector is uncoupled from the second connector;

FIG. 12 is a perspective view of the first connector, the second connector and the actuator, in which the first connector is coupled to the second connector to electrically couple a movable component to a fixed component.

DETAILED DESCRIPTION

Figure 1:
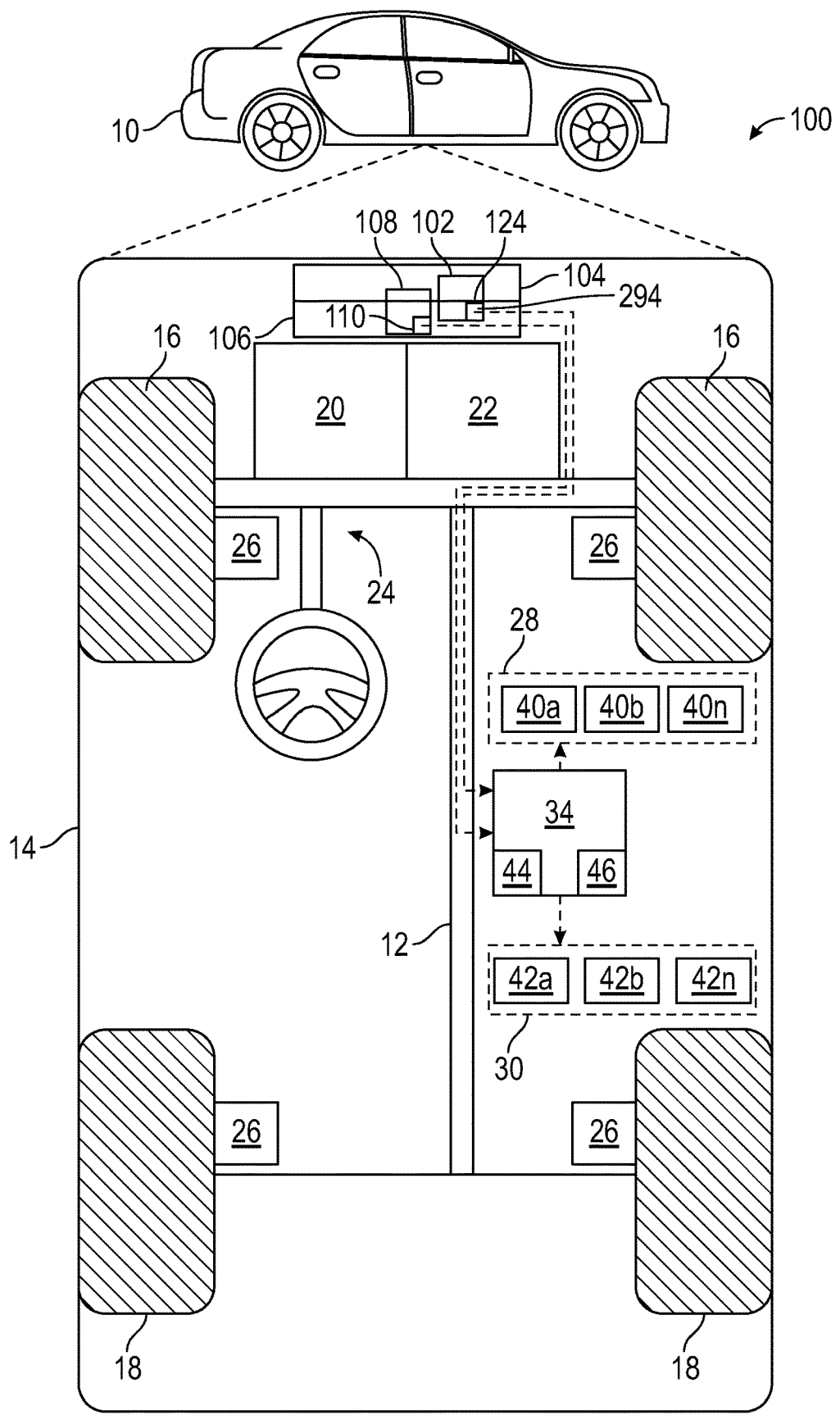
FIG. 1 is a functional block diagram illustrating a vehicle including an electrical connector system in accordance with various embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the terms "about" and "substantially" denote within 10% to account for manufacturing tolerances.

With reference to FIG. 1, an exemplary electrical connector system 100 is shown associated with a vehicle 10 in accordance with various embodiments. As will be discussed, the electrical connector system 100 enables an electrical connection to be made automatically, or without human input, between a first, fixed component 104 of the vehicle 10, such as a fascia of the vehicle 10, and a second, movable component 106 of the vehicle 10, such as a hood of the vehicle 10. In addition, while the electrical connector system 100 is disconnected, electrical connectors 132, 232 associated with the electrical connector system 100 are protected from dirt, debris, moisture, etc. to ensure that the electrical connectors 132, 232 are not inadvertently damaged while disconnected.

As depicted in FIG. 1, the vehicle 10 also generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a battery electric passenger car, but it should be appreciated that any other vehicle, including motorcycles, trucks, sport utility vehicles (SUVs), recreational vehicles (RVs), etc., can also be used.

As shown, the vehicle 10 generally includes a propulsion system 20, a transmission system 22, a steering system 24, a brake system 26, a sensor system 28, an actuator system 30 and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 24a for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 28 is in communication with the controller 34 over a communication medium.

The actuator system 30 includes one or more actuator devices 42a-42n that control one or more vehicle features such as, but not limited to, the propulsion system 20, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the electrical connector system 100. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the electrical connector system 100.

In one example, the movable component 106 is coupled to the fixed component 104 of the vehicle 10 with a latch 108. In the example of the movable component 106 as the hood of the vehicle 10, the latch 108 is the hood latch. In this example, the latch 108 includes a receptacle that captures a striker 106a (FIG. 11) that protrudes from the movable component 106 and locks to hold the movable component 106 fixed relative to the fixed component 104. The latch 108 also includes a latch feedback sensor 110, which is in communication with the controller 34 over a suitable communication media, including, but not limited to, a bus. The latch feedback sensor 110 observes a state of the latch 108. For example, a latched state in which the movable component 106 is fixed and secured to the fixed component 104 or an unlatched state in which the movable component 106 is released and movable relative to the fixed component 104. As will be discussed, the controller 34 outputs one or more control signals to the electrical connector system 100 based on the state of the latch 108.

Figure 2:
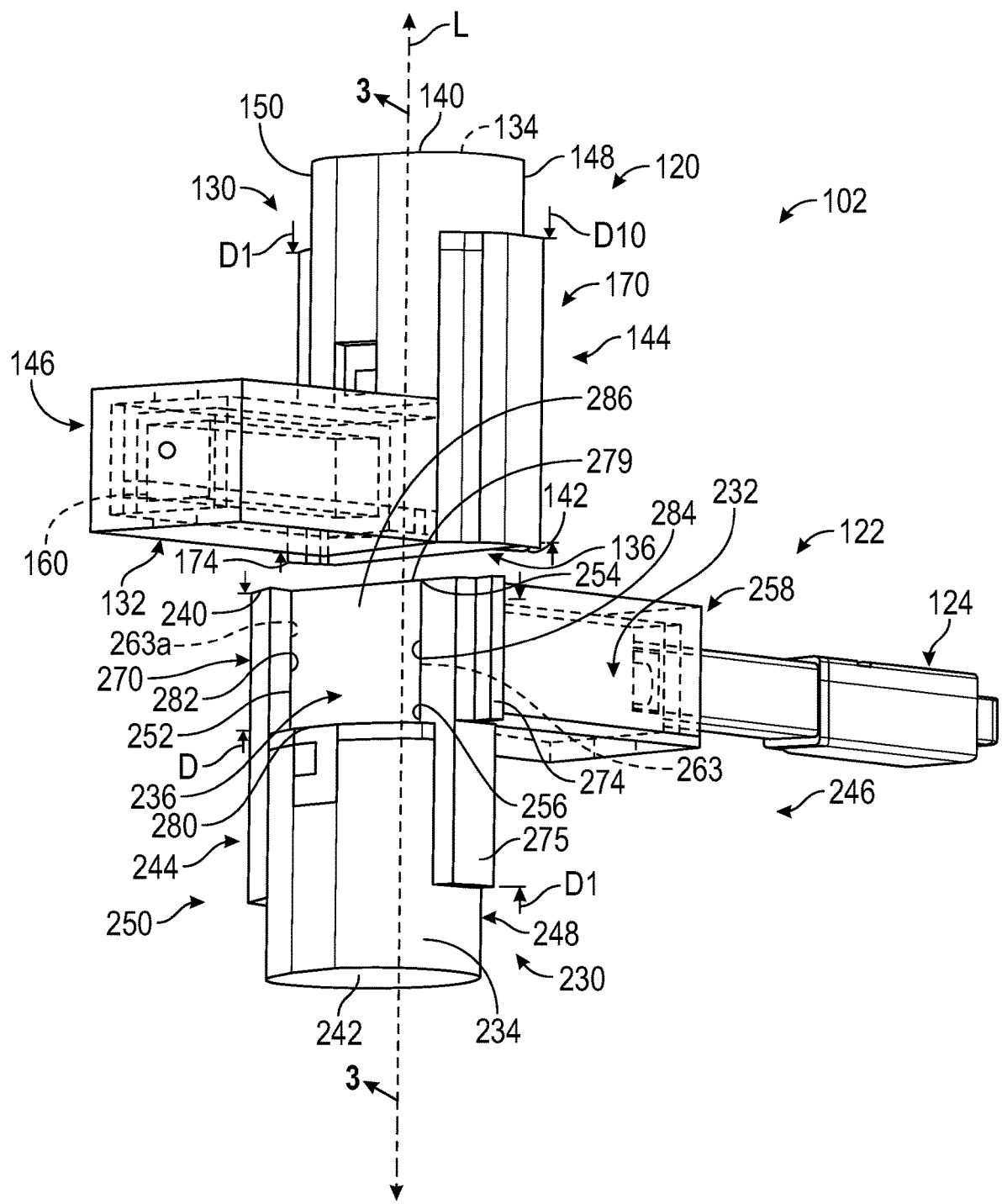
FIG. 2 is a detail view of a first connector, a second connector and an actuator of the electrical connector system of FIG. 1.

With additional reference to FIG. 2, the electrical connector system 100 is shown in more detail. The electrical connector system 100 includes a connector system 102. The connector system 102 in this example is coupled proximate the latch 108 as the connection of the striker 106a to the latch 108 has tight manufacturing tolerances. The connector system 102 includes a first connector 120, a second connector 122 and an actuator 124. Generally, the first connector 120 is a mirror image of the second connector 122 when the first connector 120 faces the second connector 122. As will be discussed, the first connector 120 is movable relative to the second connector 122 along a longitudinal axis L that extends through the connector system 102.

Figure 2A:
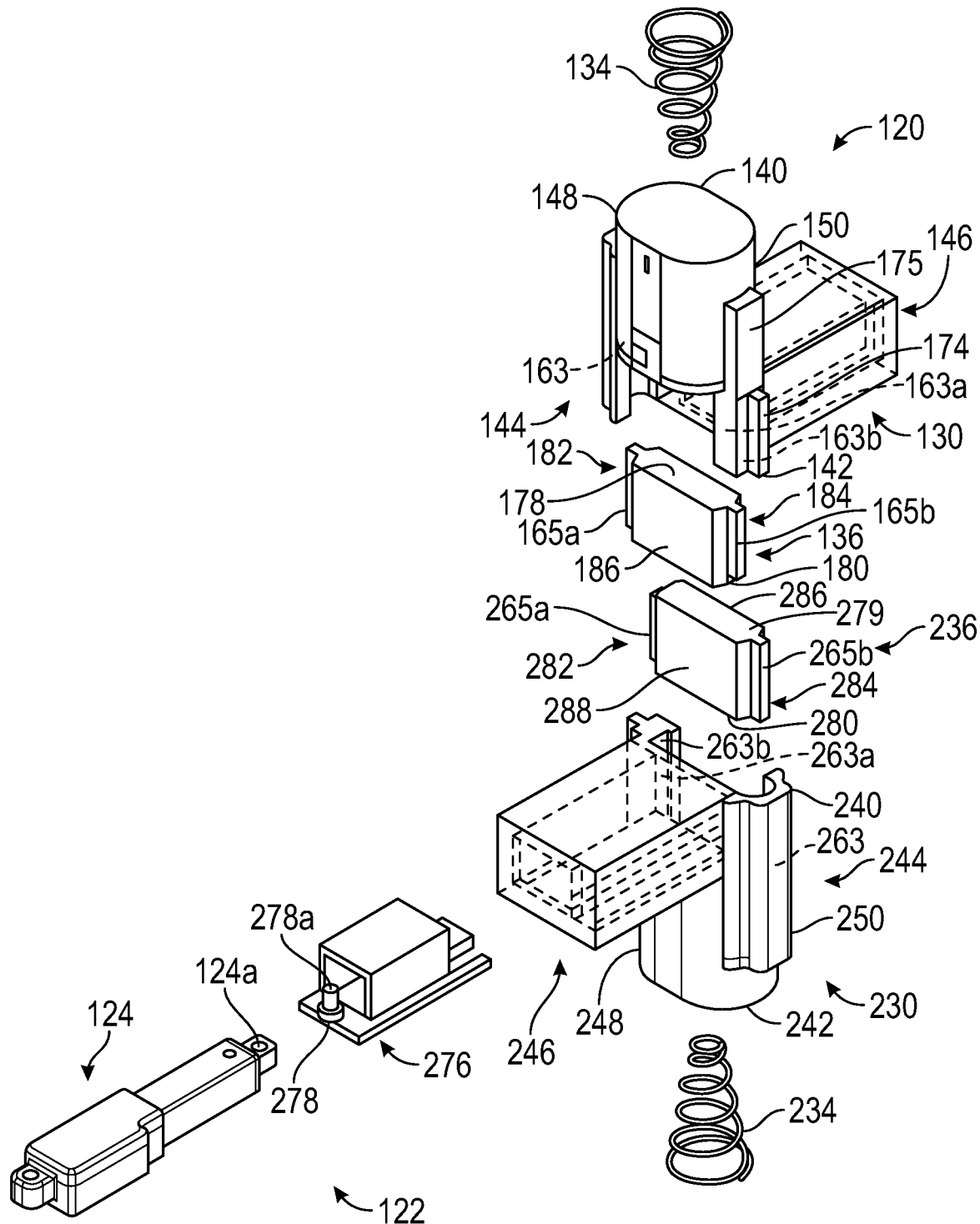
FIG. 2A is an exploded view of the first connector, the second connector and the actuator, in which a first electrical connector and a second electrical connector are not illustrated for clarity.

In one example, with reference to FIG. 2A, the first connector 120 includes a first body 130, a first electrical connector 132 (FIG. 3), a first spring 134 and a first door 136. In one example, the first body 130 is composed of a polymeric material and formed via additive manufacturing. It should be noted that the first body 130 may be composed of other materials, such as a metal or metal alloy, and formed via other techniques, including, but not limited to, casting, stamping, molding, direct metal laser sintering, etc. The first body 130 is coupled to the movable component 106 via adhesives, press-fit, mechanical fasteners, etc. Generally, the first body 130 is coupled to the movable component 106 so as to be in proximity to the striker 106a (FIG. 11). The first body 130 has a first top surface 140 opposite a first bottom surface 142, a first front end 144 opposite a first back end 146, and a first side 148 opposite a second side 150.

Figure 3:
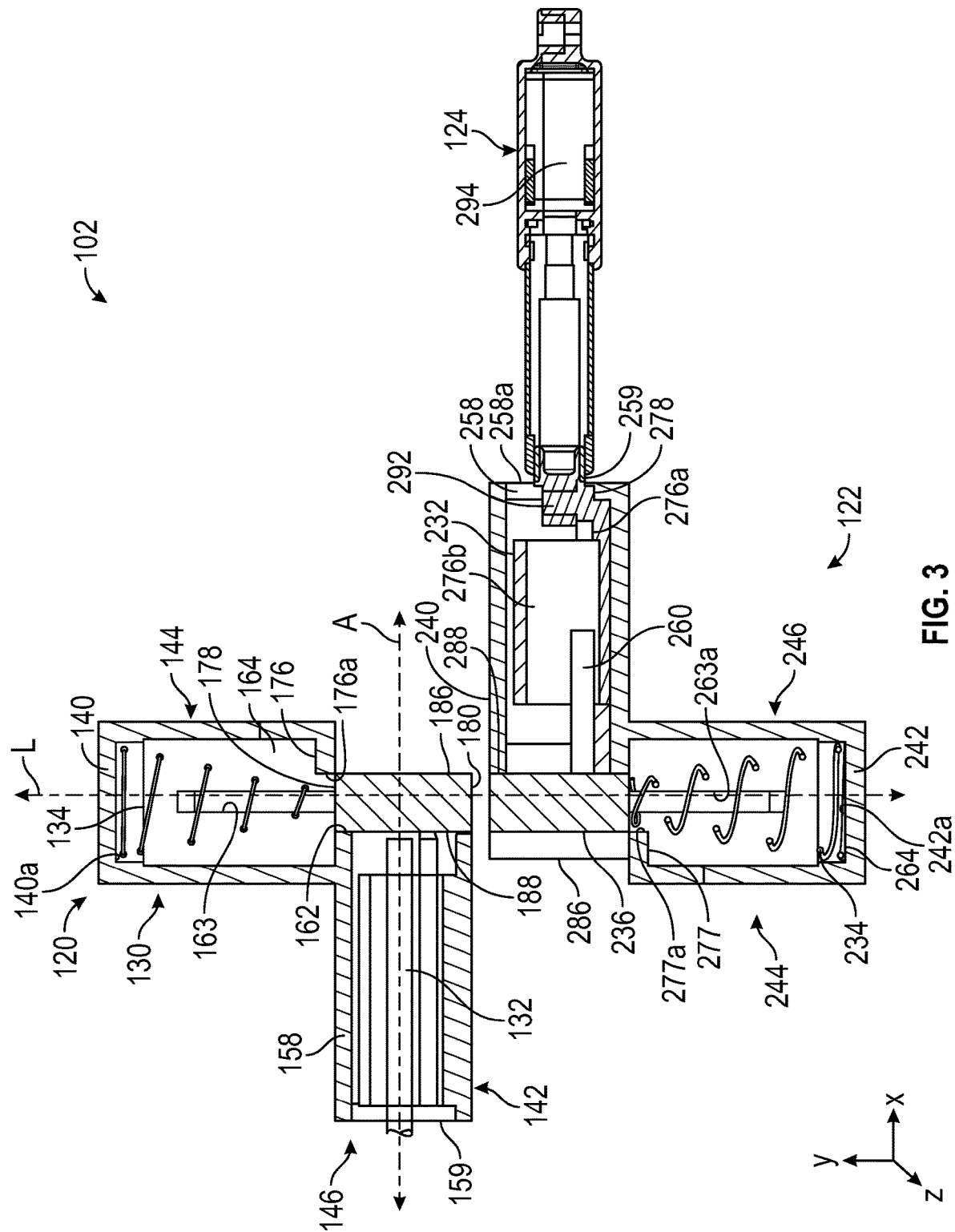
FIG. 3 is a cross-sectional view of the first connector, the second connector and the actuator of the electrical connector system FIG. 1, taken along line 3-3 of FIG. 2.
Figure 4:
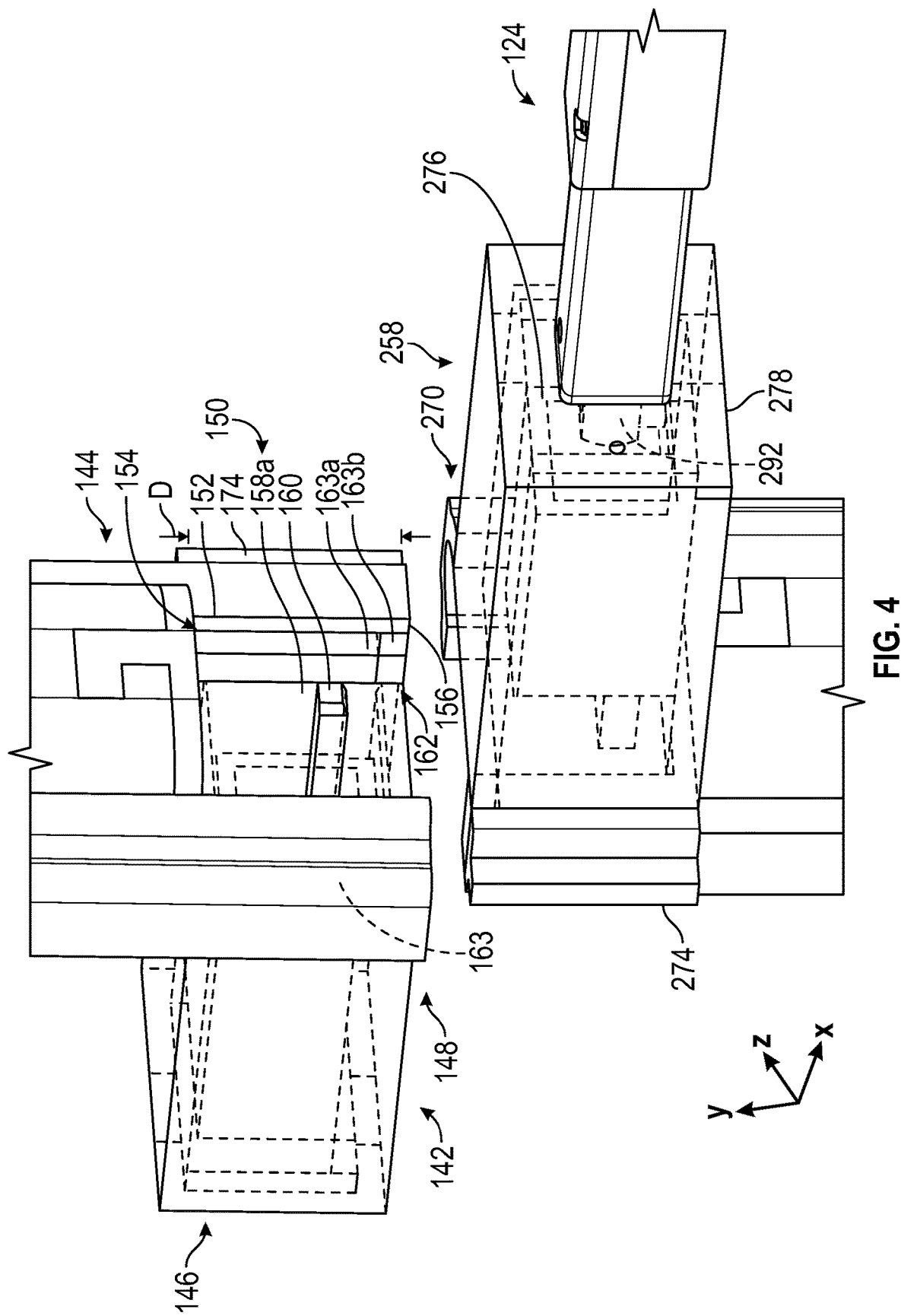
FIG. 4 is a detail perspective view of the first connector uncoupled from the second connector, in which a first door of the first connector is removed for clarity.

With reference to FIG. 2, the first top surface 140 is substantially cylindrical and is closed about its perimeter to enclose the first body 130. The first bottom surface 142 is coupled to and in contact with the second connector 122 when the connector system 102 is coupled together. The first front end 144 defines a first door opening 152, as best shown in FIG. 4. The first door opening 152 is recessed relative to the first front end 144. In FIG. 4, the first door opening 152 extends through the first front end 144 and through the first bottom surface 142. As will be discussed, the first door 136 is positioned within the first door opening 152 and encloses the first body 130 when the first connector 120 is disconnected from the second connector 122. The first door opening 152 is substantially rectangular in this example, however, the first door opening 152 may have any desired shape that corresponds with the first door 136 and the first electrical connector 132. The first door opening 152 has a first opening end 154 spaced a distance D apart from a second opening end 156. The second opening end 156 is defined at the first bottom surface 142. The distance D is about 23.4 millimeters (mm) to about 25.4 millimeters (mm). It should be noted, however, that the distance D is substantially directly proportional to a height of the first electrical connector 132 along the Y-axis. Generally, the distance D is sized to enable a movement of the first door 136 to expose pins associated with the first electrical connector 132. The Y-axis is substantially perpendicular to an X-axis, and substantially perpendicular to a Z-axis. The Y-axis is parallel to the longitudinal axis L. The first door opening 152 is in communication with or is coupled to a first receptacle 158. The first receptacle 158 extends axially from the first door opening 152 to the first back end 146. With reference to FIG. 3, the first receptacle 158 is substantially a rectangular prism, which extends from the first front end 144 toward the first back end 146 along an axis A. The axis A is substantially perpendicular to the longitudinal axis L, and is substantially parallel to the X-axis. The first receptacle 158 is substantially hollow, and receives the first electrical connector 132. Generally, at the first back end 146, the first receptacle 158 defines an opening 159 to enable an electrical cable or wire coupled to the first electrical connector 132 to pass through the first connector 120. In one example, the first back end 146 is substantially closed and defines a hole, which enables the electrical cable or wire associated with the first electrical connector 132 to pass through the first back end 146. Generally, as the first electrical connector 132 is substantially stationary, the cable associated with the first electrical connector 132 is fixed relative to the first back end 146. The first receptacle 158 is in communication with the first door opening 152 so that the first door 136 protects and substantially encloses the first electrical connector 132 contained within the first receptacle 158.

With reference back to FIG. 4, the first receptacle 158 also includes a first alignment pin 160. The first alignment pin 160 cooperates with the second connector 122 to ensure that the first electrical connector 132 is aligned properly with the second connector 122 and a connection is established between the first connector 120 and the second connector 122. In one example, the first alignment pin 160 is rectangular, and is defined along a wall 158a of the first receptacle 158. In this example, the first alignment pin 160 is defined along the wall 158a that is at the second side 150 of the first body 130, however, the first alignment pin 160 may be defined along a wall associated with the first side 148. Generally, the first alignment pin 160 extends outwardly from the wall 158a, axially along the axis A (FIG. 3), to align the movement of the second connector 122 into engagement with the first electrical connector 132.

With reference to FIG. 4, the first body 130 also defines a first door channel 162. The first door channel 162 is defined from the first bottom surface 142 at the first door opening 152 to proximate the first top surface 140. The first door channel 162 is in communication with the first door opening 152, and cooperates with the first spring 134 to guide a movement of the first door 136 between a first, closed position and a second, opened position. In the first, closed position, the first door 136 is positioned within the first door opening 152 and encloses the first electrical connector 132. In the second, opened position, the first door 136 is spaced apart from the first door opening 152 and positioned within the first door channel 162 so as to be contained within a first spring housing 164 (FIG. 3) defined between the first door opening 152 and the first top surface 140. In this example, the first door channel 162 is defined as opposing slots 163, 163a defined internally on the respective one of the first side 148 and the second side 150 and in communication with the first door opening 152. The slot 163a defined within the second side 150 includes a door stop 163b. The door stop 163b encloses the slot 163a at the first bottom surface 142, and cooperates with a first guide rail 165b of the first door 136 to inhibit the first door 136 from being inadvertently removed from the first body 130. As the door stop 163b extends into the slot 163a, the first guide rail 165b received within the slot 163a has a reduced length when compared to the first guide rail 165a of the first door 136. As will be discussed, the door stop 163b contacts the second guide rail 265b to move the second door 236 as the first connector 120 moves toward the second connector 122. The first door channel 162 guides the first door 136 from the first bottom surface 142 into the first spring housing 164 (FIG. 3). The first door channel 162 on the first side 148 may be in communication with or substantially coextensive with a channel 172 of a first guide 170. With reference to FIG. 3, the first spring housing 164 is defined between the first receptacle 158 and the first top surface 140. In one example, the first spring housing 164 is hollow, and substantially cylindrical. The first spring housing 164 extends in a direction parallel to the longitudinal axis L.

The first side 148 and the second side 150 also cooperate to couple the first connector 120 to the second connector 122. In the example of the first connector 120, with reference to FIG. 6, the first side 148 includes the first guide 170. The first guide 170 is substantially cylindrical, and extends outwardly from the first side 148. The first guide 170 is substantially parallel to the longitudinal axis L. In one example, with reference to FIG. 6, the first guide 170 is hollow, and defines the channel 172. The channel 172 is in communication with the respective slot 163, 163a. In this example, the channel 172 has a first cross-section 172a at the first bottom surface 142, and tapers to a second cross-section 172b at a distance D2 apart from the first bottom surface 142. The first cross-section 172a is substantially conical, and the second cross-section 172b is substantially square. By transitioning from a substantially conical cross-section to a substantially square cross-section, the channel 172 assists in aligning the first connector 120 with the second connector 122 and also accommodates manufacturing tolerances between the first connector 120 and the second connector 122. In one example, the distance D2 is about 12 millimeters (mm). The distance D2 is different, and greater than a distance the first alignment pin 160 is spaced apart from the first bottom surface 142. The first guide 170 extends for a distance from the first bottom surface 142 toward the first top surface 140 such that the channel 172 is sized to receive a portion of the first door 136 and a second guide rail 274 associated with the second connector 122. With brief reference to FIG. 2, the first guide 170 extends for a distance D10, which is about two times the distance D and in one example, is different and greater than a distance D1 for which a first guide rail 174 and a first stop surface 175 extends. The distance D10 is sized to enable the first door guide rail 165a and a second guide rail 274 of the second connector 122 to be received within the first guide 170 when the first connector 120 is coupled to the second connector 122. For example, the distance D10 is about 46.8 millimeters (mm) to about 50.8 millimeters (mm). The distance D1 is about 43.9 millimeters (mm) to about 47.9 millimeters (mm). The distance D10 is different and greater than the distance D.

Figure 5:
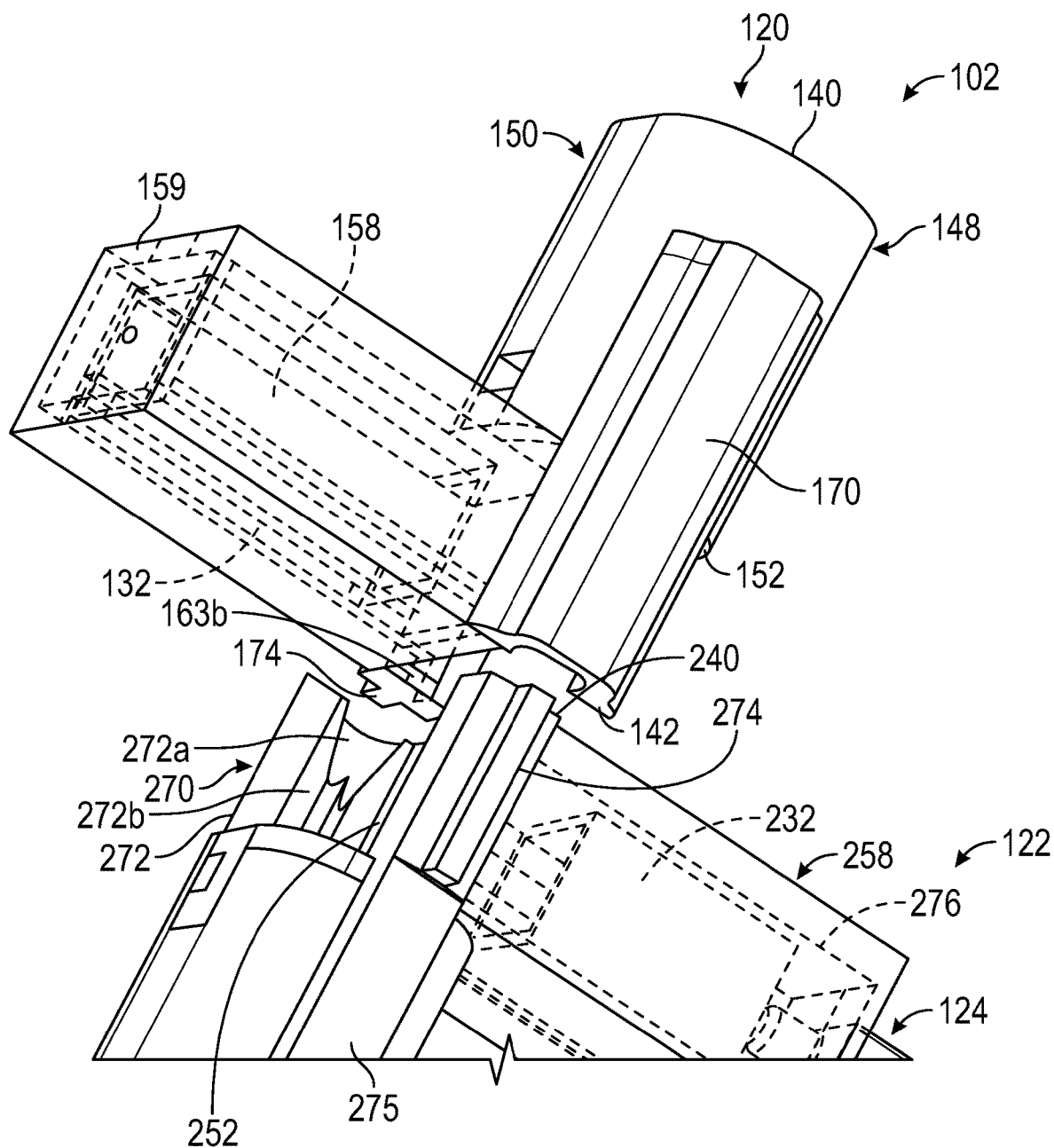
FIG. 5 is a perspective view of the first connector uncoupled from the second connector, in which the first door of the first connector and a second door of the second connector are each removed for clarity.
Figure 6:
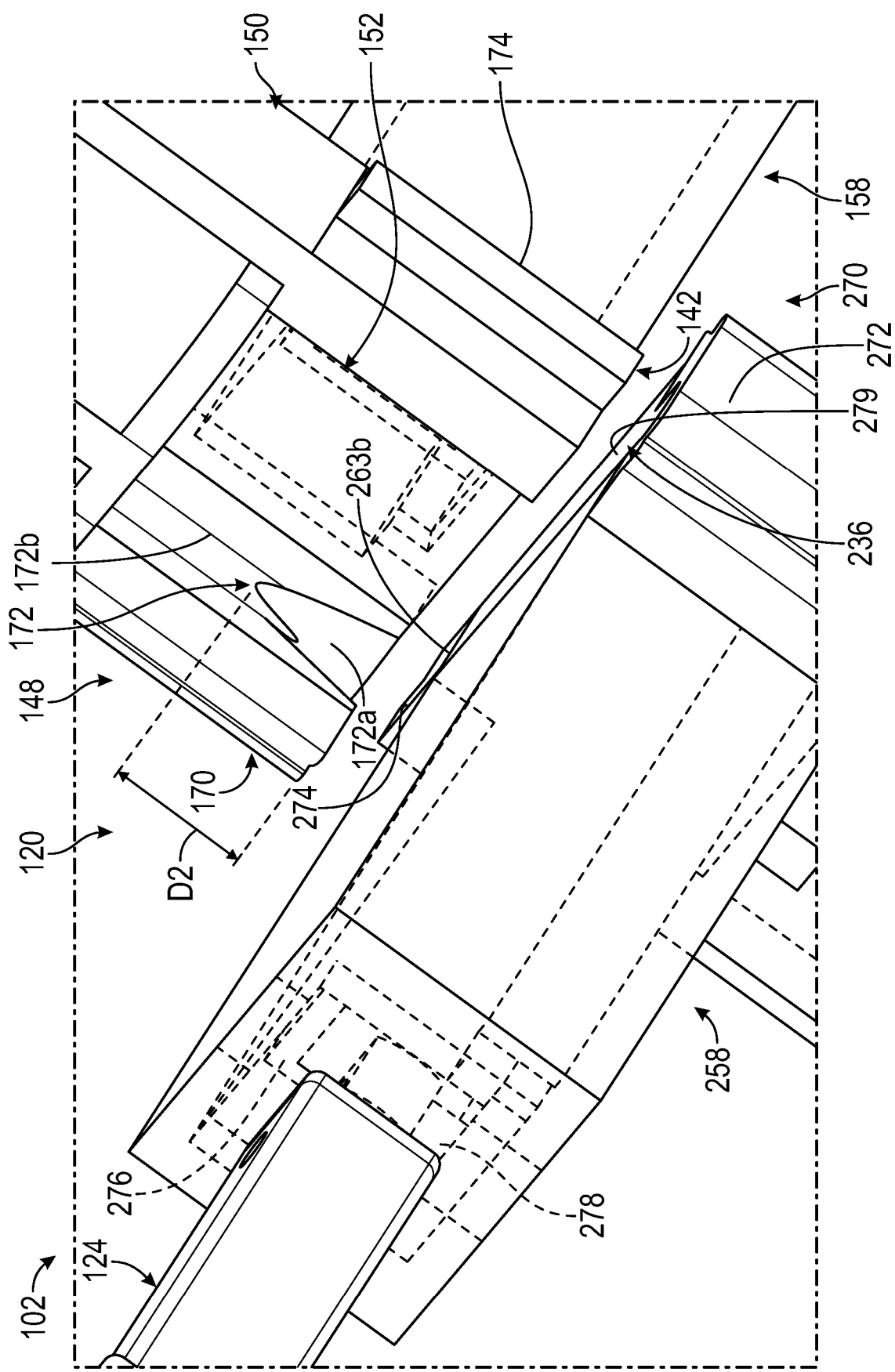
FIG. 6 is a detail perspective view of the first connector uncoupled from the second connector, in which the first door of the first connector is removed for clarity.
Figure 7:
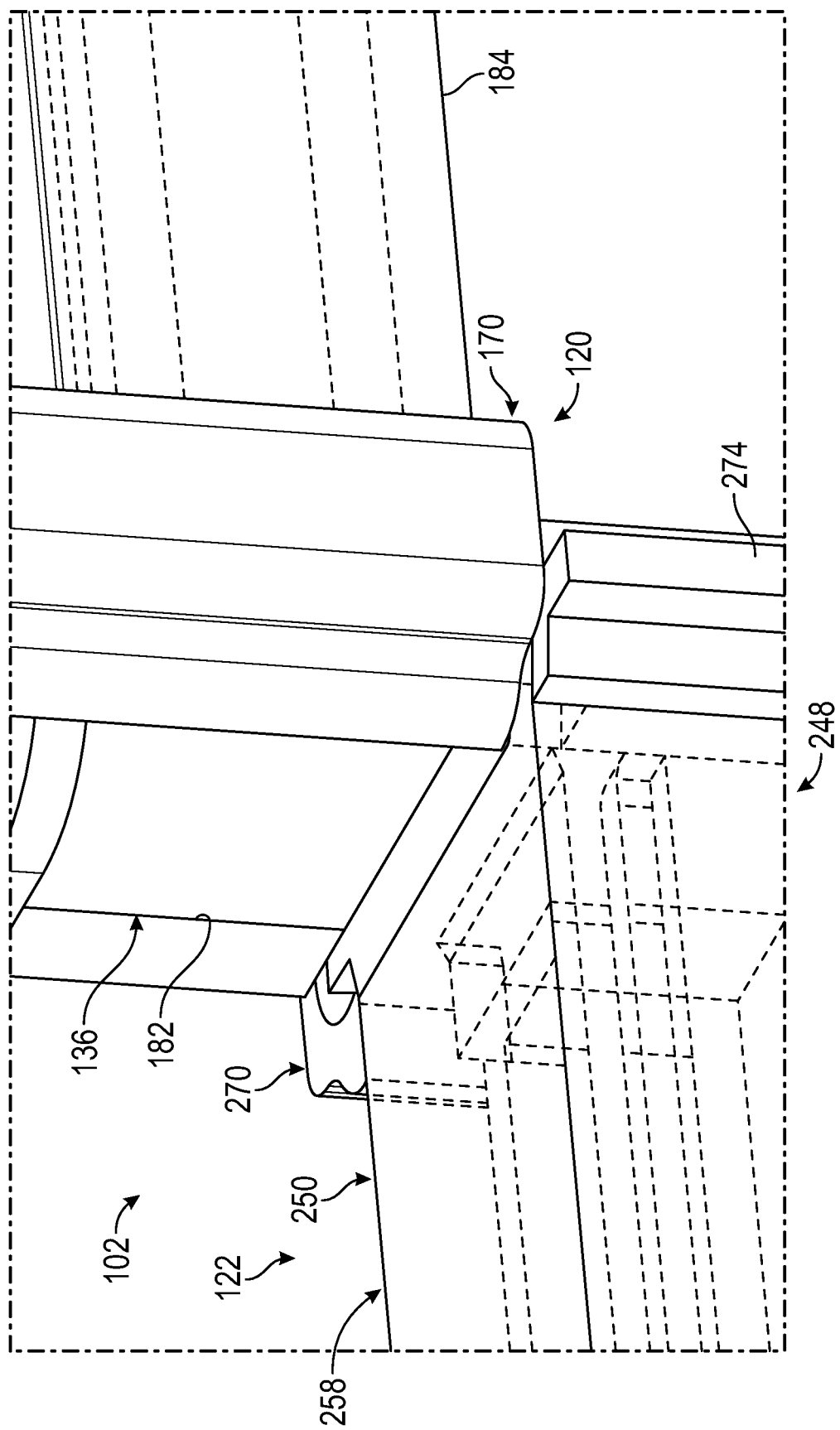
FIG. 7 is a detail perspective view of the first connector uncoupled from the second connector and aligned with the second connector for coupling to the second connector.

With reference to FIG. 6, the second side 150 includes the first guide rail 174 and the first stop surface 175. The first guide rail 174 is substantially square in cross-section (FIG. 5) and has a substantially T-shape. The first guide rail 174 extends outwardly from the second side 150 from the first bottom surface 142 toward the first top surface 140, and is substantially parallel to the longitudinal axis L (FIG. 2). The first stop surface 175 extends outwardly from the second side 150, and has a uniform surface. The second connector 122 contacts the first stop surface 175 when the first connector 120 is coupled to the second connector 122. The first guide rail 174 directs a movement of the first connector 120 relative to the second connector 122. In one example, with reference to FIG. 2, the first guide rail 174 extends for the distance D. By providing the first guide rail 174 with the distance D, the distance D ensures that a second door 236 associated with the second connector 122 is moved to a second, opened position based on the movement of the first connector 120 as will be discussed.

With reference to FIG. 3, the first electrical connector 132 is any female electrical connector for use with the vehicle 10. For example, the first electrical connector 132 is a female direct current (DC) power jack electrical connector, which electrically and physically couples with a second electrical connector 232, for example, a male DC power jack electrical connector coupled to the second connector 122. It should be noted that the female DC power jack electrical connector and the male DC power jack electrical connector are merely an example for the first electrical connector 132 and the second electrical connector 232. The first electrical connector 132 and the second electrical connector 232 may comprise a Universal Serial Bus (USB) and a USB port, a group of electrical pins and a receiver, etc. The first electrical connector 132 is coupled to the first receptacle 158 so as to be positioned adjacent or proximate the first alignment pin 160. Generally, the first electrical connector 132 is positioned adjacent to the first door 136.

With reference back to FIG. 3, the first spring 134 is contained within the first spring housing 164. In one example, the first spring 134 is a confined space conical compression spring, and biases the first door 136 into the first, closed position. The first spring 134 seats against an interior surface 140a of the first top surface 140. A second interior surface 176 opposite the interior surface 140a contains the first spring 134 within the first spring housing 164. An end 176a of the second interior surface 176 also serves to guide the movement of the first door 136 into the first spring housing 164 in the second, opened position.

The first door 136 is movable within the first door channel 162 to expose the first electrical connector 132. The first door 136 is composed of a non-conductive material, such as a non-conductive polymer-based material, and is additively manufactured, for example. The first door 136 is substantially square, however, the first door 136 may have any desired shape. The first door 136 has a first door end 178 opposite a second door end 180, and a first door side 182 (FIG. 2A) opposite a second door side 184 (FIG. 2A). The first door 136 also has a first door surface 186 opposite a second door surface 188. The first spring 134 biases against the first door end 178. The second door end 180 contacts the second connector 122 when the second connector 122 is coupled to the first connector 120. The first door side 182 and the second door side 184 (FIG. 2A) are each received in a respective one of the opposing slots 163, 163a of the first door channel 162. In one example, each of the first door side 182 and the second door side 184 include a respective first door guide rail 165a, 165b, which extends axially outward from the first door 136 from the first door end 178 toward the second door end 180 (FIG. 2A). The first door guide rails 165a, 165b are received within the respective one of the opposing slots 163, 163a. The first guide rail 165a is defined along the first door side 182, and the first guide rail 165b is defined along the second door side 184. In this example, the first guide rail 165b has a length that is different and less than the first guide rail 165a as the first guide rail 165b is received in the slot 163a. In other words, the first guide rail 165b is spaced a distance apart from the second door end 180 such that the first guide rail 165b is not flush with the second door end 180. The first guide rail 165b contacts the door stop 163b of the first door channel 162 to retain the first door 136 within the first body 130 when the first connector 120 is uncoupled from the second connector 122. The first door surface 186 defines an exterior surface of the first body 130 when the first door 136 is in the first, closed position. The second door surface 188 is proximate the first electrical connector 132 when the first door 136 is in the first, closed position.

With reference back to FIG. 2A, the second connector 122 includes a second body 230, the second electrical connector 232 (FIG. 3), a second spring 234 and a second door 236. In one example, the second body 230 is composed of a polymeric material and formed via additive manufacturing. It should be noted that the second body 230 may be composed of other materials, such as a metal or metal alloy, and formed via other techniques, including, but not limited to, casting, stamping, molding, direct metal laser sintering, etc. The second body 230 is coupled to the fixed component 104 via adhesives, press-fit, etc. Generally, the second body 230 is coupled to the fixed component 104 so as to be in proximity to the latch 108 (FIG. 11). The second body 230 has a second top surface 240 opposite a second bottom surface 242, a second front end 244 opposite a second back end 246, and a third side 248 opposite a fourth side 250.

With reference to FIG. 3, the second bottom surface 242 is substantially cylindrical and is closed about its perimeter to enclose the second body 230. The second top surface 240 is coupled to and in contact with the first connector 120 when the connector system 102 is coupled together. The second front end 244 defines a second door opening 252. The second door opening 252 is recessed relative to the second front end 244. The second door opening 252 extends through the second front end 244 and through the second top surface 240. As will be discussed, the second door 236 is positioned within the second door opening 252 and encloses the second body 230 when the second connector 122 is disconnected from the first connector 120. The second door opening 252 is substantially rectangular in this example, however, the second door opening 252 may have any desired shape that corresponds with the second door 236 and the second electrical connector 232. The second door opening 252 has a third opening end 254 spaced the distance D apart from a fourth opening end 256. The third opening end 254 is defined at the second top surface 240. The second door opening 252 is in communication with or is coupled to a second receptacle 258. The second receptacle 258 extends axially from the second door opening 252 to the second back end 246. With reference to FIG. 3, the second receptacle 258 is substantially a rectangular prism, which extends from the second front end 244 to the second back end 246 along the axis A. The second receptacle 258 is substantially hollow, and receives the second electrical connector 232. Generally, at the second back end 246, the second receptacle 258 defines a second opening 259 to enable the actuator 124 to pass through the second connector 122 and couple to the second electrical connector 232. In one example, the second back end 246 is substantially closed and defines a hole that enables an electrical cable or wire associated with the second electrical connector 232 to pass through the second back end 246 and defines a slot for the actuator 124. Generally, as the second electrical connector 232 is movable, the cable associated with the second electrical connector 232 has some slack to move with the actuator 124 without contacting walls of the second receptacle 238. The second receptacle 258 is in communication with the second door opening 252 so that the second door 236 protects and substantially encloses the second electrical connector 232 contained within the second door opening 252.

The second body 230 also includes a second alignment pin 260. The second alignment pin 260 cooperates with the first connector 120 to ensure that the second electrical connector 232 is aligned properly with the first connector 120 and a connection is established between the first connector 120 and the second connector 122. In one example, the second alignment pin 260 is rectangular, and is defined along a wall 276b of a connector housing 276. In this example, the second alignment pin 260 is defined along the wall 276b of the connector housing 276 that is at the fourth side 250 proximate a wall 258a of the second receptacle 258, however, the second alignment pin 260 may be defined along a wall associated with the third side 248. Generally, the second alignment pin 260 extends outwardly from the interior surface 276a, axially along the axis A, to align the movement of the second connector 122 into engagement with the first electrical connector 132.

Figure 8:
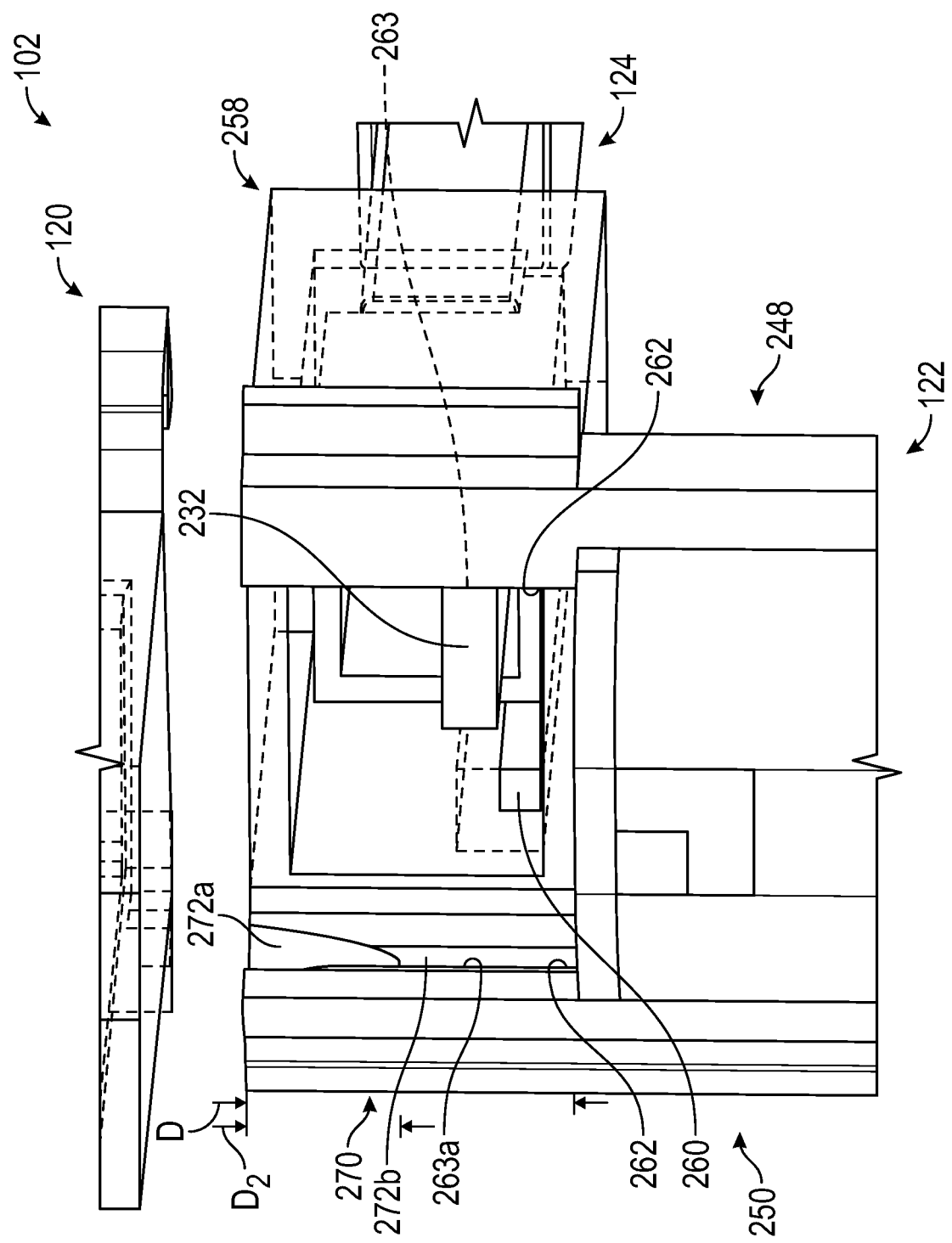
FIG. 8 is a detail perspective view of the second connector uncoupled from the first connector, in which the second door is removed for clarity.

With reference to FIG. 8, the second body 230 also defines a second door channel 262. The second door channel 262 is defined from the second top surface 240 at the second door opening 252 to proximate the second bottom surface 242. The second door channel 262 is in communication with the second door opening 252, and cooperates with the second spring 234 to guide a movement of the second door 236 between a first, closed position and a second, opened position. In the first, closed position, the second door 236 is positioned within the second door opening 252 and encloses the second electrical connector 232. In the second, opened position, the second door 236 is spaced apart from the second door opening 252 and positioned within the second door channel 262 so as to be contained within a second spring housing 264 (FIG. 3) defined between the second door opening 252 and the second bottom surface 242. In this example, the second door channel 262 is defined as opposing slots 263a, 263 defined internally on the respective one of the third side 248 and the fourth side 250 and in communication with the second door opening 252. The slot 263a defined within the third side 248 includes a door stop 263b. The door stop 263b encloses the slot 263a at the second top surface 240, and cooperates with the second guide rail 265a of the second door 236 to inhibit the second door 236 from being inadvertently removed from the second body 230. As the door stop 263b extends into the slot 263a, the second guide rail 265a received within the slot 263a has a reduced length when compared to the second guide rail 256b of the second door 236. The door stop 263b contacts the first guide rail 165a to move the first door 136 as the first connector 120 moves toward the second connector 122. The second door channel 262 guides the second door 236 from the second top surface 240 into the second spring housing 264 (FIG. 3). The second door channel 262 on the fourth side 250 may be in communication with or substantially coextensive with a second channel 272 of a second guide 270. With reference to FIG. 3, the second spring housing 264 is defined between the second receptacle 258 and the second bottom surface 242. In one example, the second spring housing 264 is hollow, and substantially cylindrical. The second spring housing 264 extends in a direction parallel to the longitudinal axis L.

The third side 248 and the fourth side 250 also cooperate to couple the first connector 120 to the second connector 122. In the example of the second connector 122, with reference to FIG. 2, the third side 248 includes the second guide rail 274 and a second stop surface 275. The second guide rail 274 is substantially square in cross-section and has a substantially T-shape. The second guide rail 274 extends outwardly from the third side 248 from the second top surface 240 toward the second bottom surface 242, and is substantially parallel to the longitudinal axis L. The second stop surface 275 extends outwardly from the third side 248, and has a uniform surface. The first connector 120 contacts the second stop surface 275 when the first connector 120 is coupled to the second connector 122. The second guide rail 274 directs a movement of the second connector 122 relative to the first connector 120. In one example, the second guide rail 274 extends for the distance D. By providing the second guide rail 274 with the distance D, the distance D ensures that first door 136 associated with the first connector 120 is moved to the second, opened position based on the movement of the second connector 122 as will be discussed.

The fourth side 250 includes the second guide 270. The second guide 270 is substantially cylindrical, and extends outwardly from the fourth side 250. The second guide 270 is substantially parallel to the longitudinal axis L (FIG. 2). In one example, the second guide 270 is hollow, and defines the second channel 272. The second channel 272 is in communication with the respective slot 263a, 263. In this example, the second channel 272 has a third cross-section 272a at the second top surface 240, and tapers to a fourth cross-section 272b at the distance D2 apart from the second top surface 240. The third cross-section 272a is substantially conical, and the fourth cross-section 272b is substantially square. By transitioning from a substantially conical cross-section to a substantially square cross-section, the second channel 272 assists in aligning the first connector 120 with the second connector 122 and also accommodates manufacturing tolerances between the first connector 120 and the second connector 122. The distance D2 is different, and greater than a distance the second alignment pin 260 is spaced apart from the second top surface 240. The second guide 270 extends for a distance from the second top surface 240 toward the second bottom surface 242 such that the second channel 272 is sized to receive a portion of the second door 236 and the first guide rail 174 associated with the first connector 120. The second guide 270 extends for the distance D10, which is about two times the distance D and in one example, is different and greater than the distance D1 for which the second guide rail 274 and the second stop surface 275 extends. The distance D10 is sized to enable a second door guide rail 265b and the first guide rail 174 of the first connector 120 to be received within the second guide 270 when the first connector 120 is coupled to the second connector 122.

With reference to FIG. 3, the second electrical connector 232 is any male electrical connector for use with the vehicle 10 that is compatible with the first electrical connector 132. For example, the second electrical connector 232 is a male direct current (DC) power jack electrical connector, which electrically and physically couples with the first electrical connector 132. The second electrical connector 232 is coupled to the second receptacle 258 so as to be positioned adjacent or proximate the second alignment pin 260. Generally, the second electrical connector 232 is positioned adjacent to the second door 236. In one example, the second electrical connector 232 is coupled to the connector housing 276. The connector housing 276 is movable or slidable relative to the second receptacle 258 by the actuator 124 to electrically couple and uncouple the second electrical connector 232 from the first electrical connector 132. In this example, the connector housing 276 is a hollow rectangular prism, which surrounds the second electrical connector 232. The connector housing 276 includes an interior surface 276a, which is coupled to the second electrical connector 232, via welding, adhesives, etc. The wall 276b extends upward from the interior surface 276a. The connector housing 276 also includes a flange 278. The flange 278 extends upward and outward from the interior surface 276a of the connector housing 276 to be proximate the second opening 259. The flange 278 may extend above the interior surface 276a to facilitate coupling of the actuator 124 to the connector housing 276, if desired. In one example, the flange 278 may include a post 278a (FIG. 2A), which engages with a bore 124a of the actuator 124 to couple the actuator 124 to the connector housing 276 (FIG. 2A). In this example, the second alignment pin 260 is integrally formed with the connector housing 276.

The second spring 234 is contained within the second spring housing 264. In one example, the second spring 234 is a confined space conical compression spring, and biases the second door 236 into the first, closed position. The second spring 234 seats against a third interior surface 242a of the second bottom surface 242. A fourth interior surface 277 opposite the interior surface 240a contains the second spring 234 within the second spring housing 264. An end 277a of the fourth interior surface 277 also serves to guide the movement of the second door 236 into the second spring housing 264 in the second, opened position.

The second door 236 is movable within the second door channel 262 to expose the second electrical connector 232. The second door 236 is composed of a non-conductive material, such as a non-conductive polymer-based material, and is additively manufactured, for example. The second door 236 is substantially square, however, the second door 236 may have any desired shape. The second door 236 has a first door end 279 opposite a second door end 280, and a first door side 282 opposite a second door side 284. The second door 236 also has a first door surface 286 (FIG. 2A) opposite a second door surface 288 (FIG. 2A). The second spring 234 biases against the second door end 280. The first door end 279 contacts the first connector 120 when the second connector 122 is coupled to the first connector 120. The first door side 282 and the second door side 284 are each received in a respective one of the opposing slots 263a, 263 of the second door channel 262. In one example, each of the first door side 282 and the second door side 284 include a respective second door guide rail 265a, 265b, which extends axially outward from the second door 236 from the second door end 280 toward the first door end 279 (FIG. 2A). The second door guide rails 265a, 265b are received within the respective one of the opposing slots 263a, 263. The second guide rail 265a is defined along the first door side 282, and the second guide rail 265b is defined along the second door side 284. In this example, the second guide rail 265a has a length that is different and less than the second guide rail 265b as the second guide rail 265a is received in the slot 263a. In other words, the second guide rail 265a is spaced a distance apart from the first door end 279 such that the second guide rail 265a is not flush with the first door end 279. The second guide rail 265a contacts the door stop 263b of the second door channel 262 to retain the second door 236 within the second body 230 when the first connector 120 is uncoupled from the second connector 122. The first door surface 286 defines an exterior surface of the second body 230 when the second door 236 is in the first, closed position. The second door surface 288 is proximate the second electrical connector 232 when the second door 236 is in the first, closed position (FIG. 3).

The actuator 124 is in communication with the controller 34 over a suitable communication media that facilitates the transfer of data, power, etc., including, but not limited to a bus (FIG. 1). With reference to FIG. 3, the actuator 124 is coupled to the flange 278 of the connector housing 276 and is controlled by the controller 34 to move the second electrical connector 232 into and out of engagement with the first electrical connector 132. In one example, the actuator 124 is a micro linear actuator with position feedback. For example, the actuator 124 includes, but is not limited to, an L12-P micro linear actuator with position feedback commercially available from Actuonix Motion Devices of Victoria, British Columbia, Canada. The actuator 124 includes a shaft 292, which is coupled to the flange 278. An advancement of the shaft 292 by the controller 34 moves the second electrical connector 232 out of the second receptacle 258 and into engagement with the first electrical connector 132. A retraction of the shaft 292 by the controller 34 disengages the second electrical connector 232 from the first electrical connector 132, and moves the second electrical connector 232 back into the second receptacle 258 to enable the second door 236 to move to the second, closed position. The actuator 124 includes a position sensor 294. The position sensor 294 observes a position of the shaft 292, and generates sensor signals based on the observation. The position sensor 294 provides the observed position of the shaft 292 to the controller 34 (FIG. 1).

Figure 9:
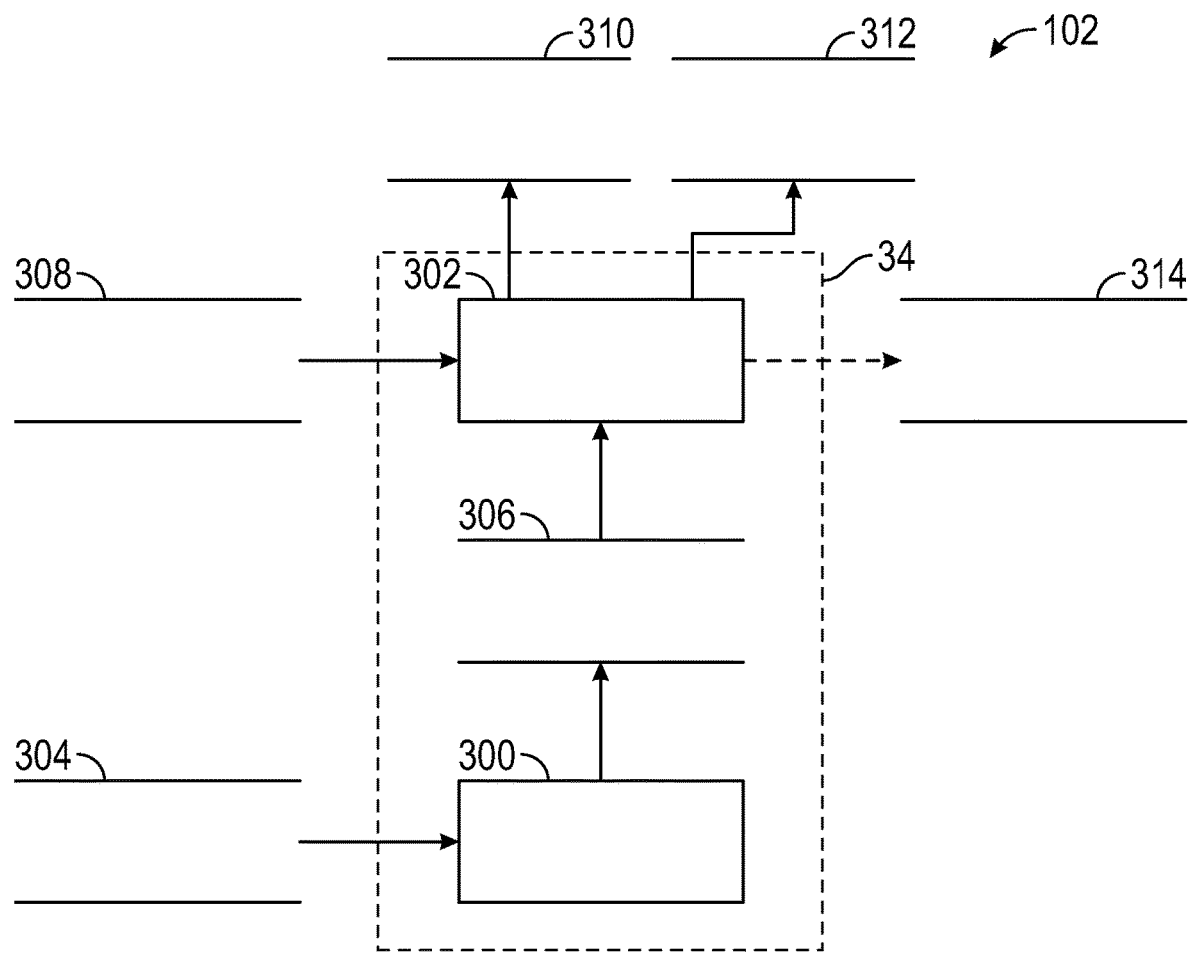
FIG. 9 is a dataflow diagram illustrating a control system associated with the electrical connector system, in accordance with various embodiments.

For example, as shown in more detail with regard to FIG. 9 and with continued reference to FIGS. 1-8, a dataflow diagram illustrates various embodiments of a control system associated with the electrical connector system 100, which may be embedded within the controller 34. Various embodiments of the electrical connector system 100 according to the present disclosure can include any number of sub-modules embedded within the controller 34. As can be appreciated, the sub-modules shown in FIG. 9 can be combined and/or further partitioned to similarly determine whether to extend or retract the actuator 124 to couple or uncouple the second electrical connector 232 from the first electrical connector 132. Inputs to the electrical connector system 100 may be received from the latch feedback sensor 110 (FIG. 1), received from the position sensor 294 (FIG. 1), received from other control modules (not shown) associated with the vehicle 10, and/or determined/modeled by other sub-modules (not shown) within the controller 34. In various embodiments, the electrical connector system 100 includes a latch monitor module 300 and an actuator control module 302.

The latch monitor module 300 receives as input latch state data 304. The latch state data 304 is sensor data from the latch feedback sensor 110. The latch state data 304 indicates the state of the latch 108. For example, the latch state data 304 indicates whether the latch 108 is in the latched state such that the movable component 106 is coupled to the fixed component 104 and is fixed relative to the fixed component 104; or whether the latch 108 is in the unlatched state such that the movable component 106 is released or uncoupled from the fixed component 104 and is movable relative to the fixed component 104. Based on the latch state data 304, the latch monitor module 300 sets latch data 306 for the actuator control module 302. The latch data 306 is data that indicates that the latch 108 is in the latched state or in the unlatched state.

The actuator control module 302 receives as input the latch data 306. The actuator control module 302 also receives as input actuator position data 308. The actuator position data 308 is data from the position sensor 294. For example, the actuator position data 308 is a data of a position of the shaft 292 (FIG. 2) of the actuator 124. Based on the latch state of unlatched, the actuator control module 302 determines the position of the shaft 292 of the actuator 194. If the position of the shaft 292 is extended, such that the second electrical connector 232 is physically and electrically coupled to the first electrical connector 132, the actuator control module 302 outputs actuator retract data 310. The actuator retract data 310 is data that includes one or more control signals to the actuator 124 to retract the shaft 292 into the second receptacle 258 to disengage the second electrical connector 232 from the first electrical connector 132. By disengaging the second electrical connector from the first electrical connector 132 and retracting the shaft 292 into the second receptacle 258, the second spring 234 biases the second door 236 into the first, closed position when the movable component 106 is moved and the first connector 120 is disengaged from the second connector 122. It should be noted that in certain embodiments, the actuator control module 302 may be responsive to user interface data, such as input to a human-machine interface associated with the vehicle 10, to output the actuator retract data 310 and/or the actuator extend data 312. For example, the human-machine interface may include a button for unlatching or unlatching the movable component 106, and based on the receipt of the input, the actuator control module 302 may output the respective one of the actuator retract data 310 and the actuator extend data 312.

Based on the latch state of latched, the actuator control module 302 determines the position of the shaft 292 of the actuator 194. If the position of the shaft 292 is retracted, such that the second electrical connector 232 is physically and electrically coupled to the first electrical connector 132, the actuator control module 302 outputs actuator extend data 312. The actuator extend data 312 is data that includes one or more control signals to the actuator 124 to extend the shaft 292 from the second receptacle 258 to physically and electrically couple the second electrical connector 232 to the first electrical connector 132. This ensures that the electrical connection is established between the first electrical connector 132 and the second electrical connector 232 when the movable component 106 is fixed in position relative to the fixed component 104.

Optionally, the actuator control module 302 may also output actuator status data 314. The actuator status data 314 is data that indicates whether the shaft 292 of the actuator 124 is retracted such that the second electrical connector 232 is disconnected from the first electrical connector 132 and retained within the second receptacle 258; or extended such that the second electrical connector 232 is electrically and physically coupled to the first electrical connector 132. The actuator status data 314 may be output to other modules associated with the controller 34.

Figure 10:
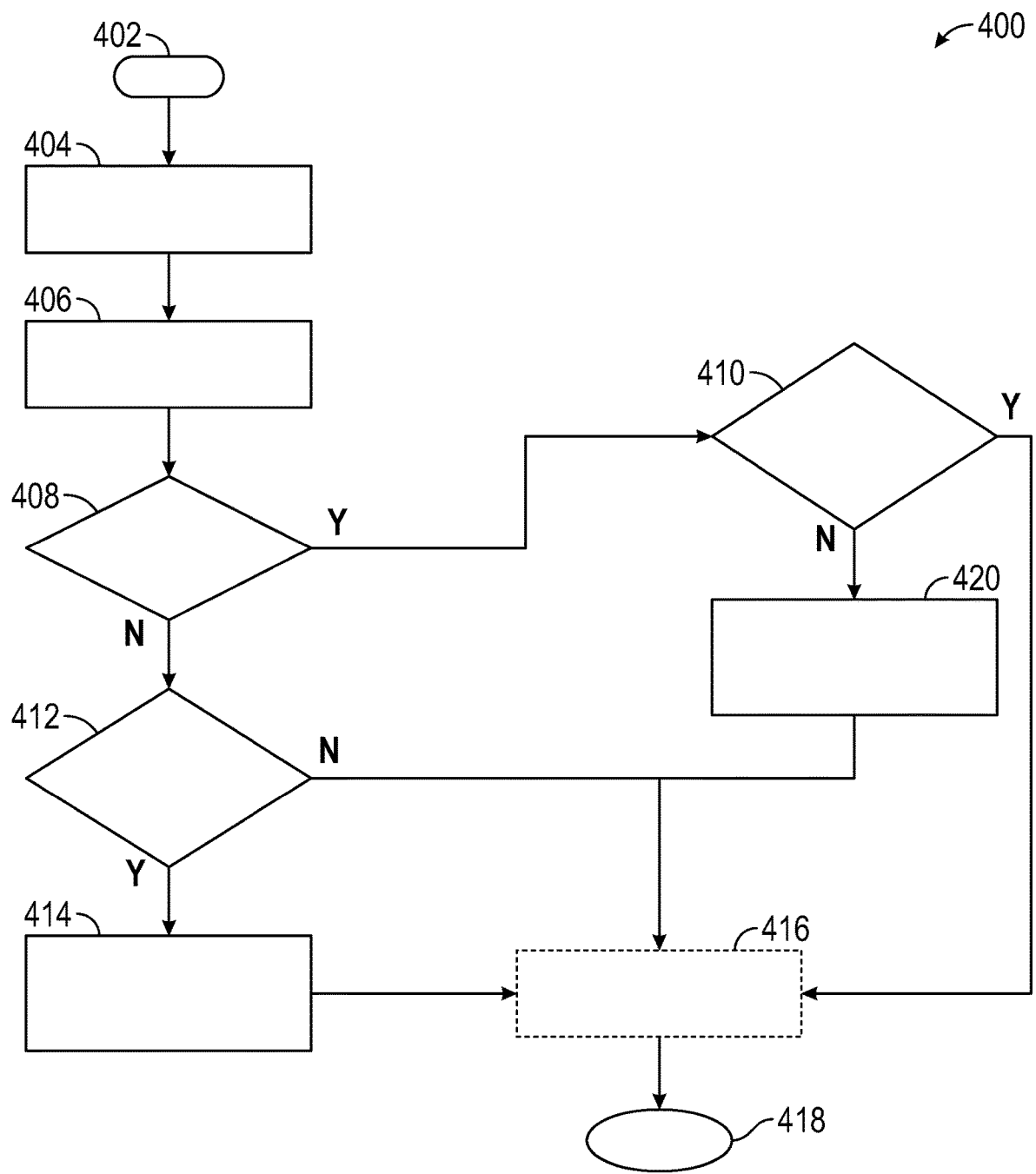
FIG. 10 is a flowchart illustrating a method that can be performed by the electrical connector system in accordance with various embodiments.

Referring now to FIG. 10, and with continued reference to FIGS. 1-9, a flowchart illustrates a method 400 that can be performed by the control system of the electrical connector system 100 of FIG. 1 in accordance with the present disclosure. In one example, the method 400 is performed by the processor 44 of the controller 34. As can be appreciated in light of the disclosure, the order of operation within the method is not limited to the sequential execution as illustrated in FIG. 10, but may be performed in one or more varying orders as applicable and in accordance with the present disclosure. In various embodiments, the method 400 can be scheduled to run based on one or more predetermined events, and/or may run continuously during operation of the vehicle 10.

The method begins at 402. At 404, the method receives as input the latch state data 304 from the latch feedback sensor 110. At 406, the method receives as input the actuator position data 308 from the position sensor 294. At 408, the method determines whether the state of the latch 108 is latched. If true, the method proceeds to 410. Otherwise, at 412, the method determines that the state of the latch 108 is unlatched and determines whether the shaft 292 of the actuator 124 is extended based on the actuator position data 308. If the shaft 292 of the actuator 124 is extended, such that the second electrical connector 232 is coupled to the first electrical connector 132, at 414, the method outputs the actuator retract data 310 to retract the shaft 292 of the actuator 124. If the shaft 292 of the actuator 124 is not extended, the method proceeds to optional 416. At 416, the method outputs the actuator status data 314 to indicate the position of the shaft 292 of the actuator 124 (retracted or extended). The method ends at 418. If at 412 the shaft 292 of the actuator 124 is not extended or is retracted, the method proceeds to 416.

At 410, the method determines whether the shaft 292 of the actuator 124 is extended when the state of the latch 108 is latched. If true, the method proceeds to 416. Otherwise, at 420, the method outputs the actuator extend data 312 to extend the shaft 292 of the actuator 124 to engage the second electrical connector 232 with the first electrical connector 132.

Thus, generally, with reference to FIG. 11, when the latch 108 is in the unlatched state such that the striker 106a is disengaged or unsecured from the latch 108, the movable component 106 may be positioned relative to the fixed component 104 such that the first door 136 and the second door 236 are biased by the springs 134, 234 into the first, closed positions to enclose the respective first body 130 and second body 230. In the example of the movable component 106 as the hood of the vehicle 10, as the striker 106a starts to engage with the latch 108, the first bottom surface 142, including the door stop 163b, of the first body 130 contacts the second door 236 and the second top surface 240, including the door stop 263b, of the second body 230 contacts the first door 136. The first guide rail 174 contacts the second door guide rail 265b and enters into the second channel 272 of the second guide 270, and the second guide rail 274 contacts the first door guide rail 165a and enters into the channel 172 of the first guide 170. The continued engagement of the striker 106a with the latch 108 causes the first body 130 to move toward the second body 230, which advances the guide rails 174, 274 in the guides 170, 270 and moves the doors 136, 236 toward the second, opened positions.

Figure 13:
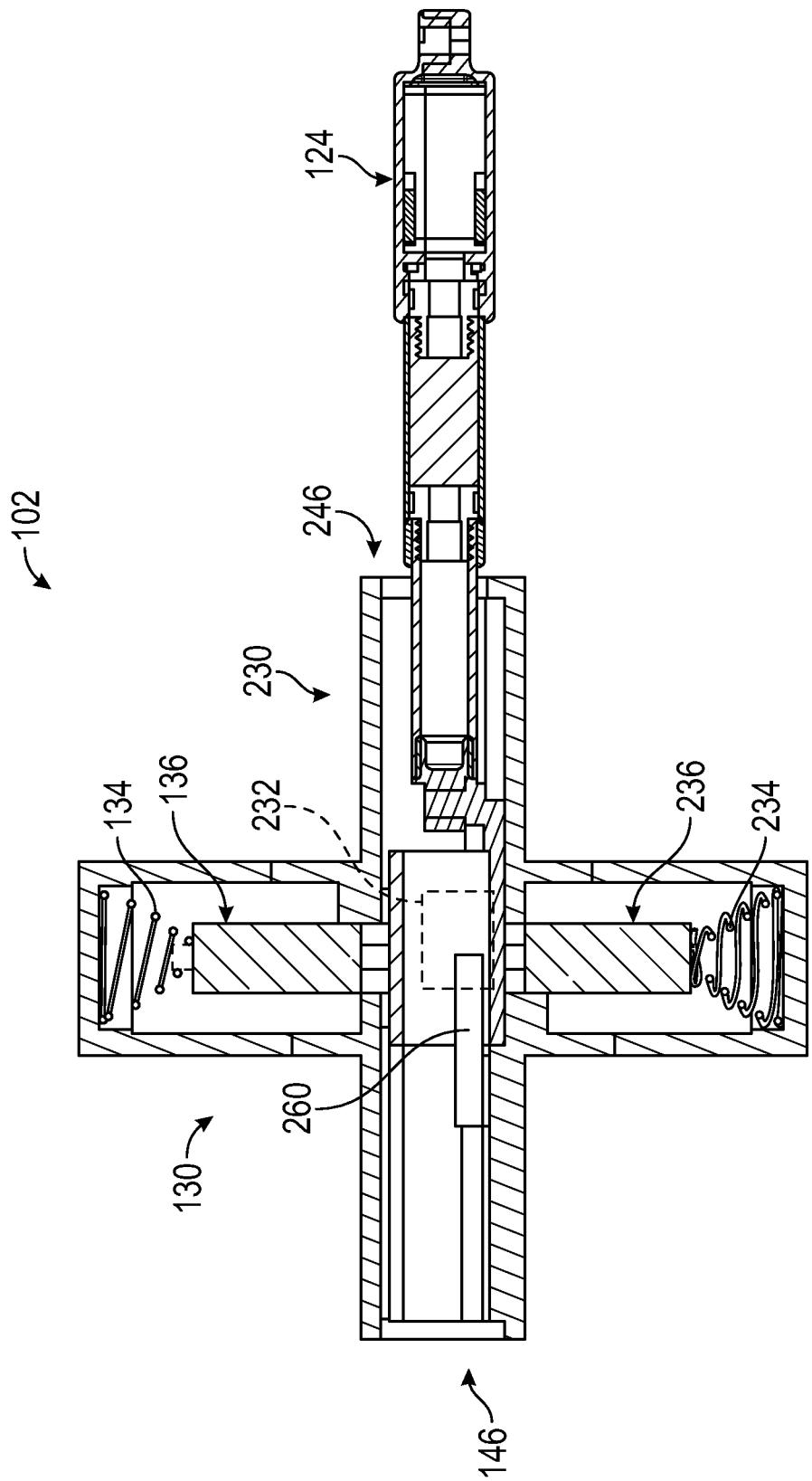
FIG. 13 is a cross-sectional view of the first connector, the second connector and the actuator of FIG. 12, taken along line 13-13 of FIG. 12.

With reference to FIG. 12, once the movable component 106 is advanced toward the fixed component 104 such that the latch 108 is engaged with the striker 106a, the latch 108 is in the latched state and the first connector 120 is coupled to the second connector 122. With the first connector 120 coupled to the second connector 122, the doors 136, 236 are in the second, opened positions and retained in the respective spring housings 164, 264, as shown in FIG. 13. The latch feedback sensor 110 communicates the latch state data 304 to the controller 34 (FIGS. 1 and 9), and based on the latch state data 304, the controller 34 outputs the actuator extend data 312 to extend the shaft 292 of the actuator 124 (FIGS. 1 and 9). As the actuator 124 extends, the connector housing 276 is advanced toward the first receptacle 158, and the alignment pins 160, 260 guide the connector housing 276, and thus, the second electrical connector 232 into engagement with the first electrical connector 132. Generally, the connector housing 276 is sized to move the second electrical connector 232 without contacting the first electrical connector 132. When the shaft 292 of the actuator 124 is extended, such that the second electrical connector 232 is physically and electrically coupled to the first electrical connector 132, the actuator status data 314 may be transmitted to other modules associated with the controller 34 (FIG. 9).

Thus, the electrical connector system 100 enables the movable component 106 to be electrically coupled to the fixed component 104 without requiring a technician or user to manually disconnect the electrical connectors 132, 232. In addition, the use of the first connector 120 and the second connector 122 including the doors 136, 236 ensures that the electrical connectors 132, 232 remain free of dirt, debris, moisture, etc. as the movable component 106 moves relative to the fixed component 104. In addition, the first connector 120 and the second connector 122 also reduce wiring harness complexity, by enabling the electrical connection to be positioned proximate the latch 108 instead at a pivot point for the hood, for example. In addition, the electrical connector system 100 may be used to align the movement between the movable component 106 and the fixed component 104. For example, when attaching removable doors to the body 14 of the vehicle 10, the first body 130 and the second body 230 may be used to align the doors in the correct position relative to the body 14.

In addition, it should be noted that while the electrical connector system 100 is discussed and illustrated herein as being used to electrically couple a lighted portion of a hood to a fascia of the vehicle 10, the electrical connector system 100 may be employed with various other components associated with the vehicle 10 to establish an electrical connection between a movable component and a fixed component. For example, the movable component 106 may be a removable touchscreen or display screen and the fixed component 104 may be a portion of a dashboard of the vehicle 10. As a further example, the movable component 106 may be a taillamp, and the fixed component 104 may be a rear fascia, bumper, liftgate, endgate, etc. As another example, the movable component 106 may be a seat or a door, and the fixed component 104 may be the body 14 of the vehicle 10. In addition, while the connector system 102 has been described herein as including the actuator 124, which is powered by the controller 34, the connector housing 276 may be coupled to the latch 108 via a mechanical or manual pull-cable, for example, and a movement of the latch 108 between the latched and unlatched states may push or pull the cable to extend or retract the second electrical connector 232. Furthermore, while the second connector 122 and the actuator 124 are illustrated and described herein as being separate from the latch 108, the second connector 122 and the actuator 124 may be integrated into the latch 108 or formed with the latch 108.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electrical connector system for electrically coupling a movable component to a fixed component, comprising:
   a first connector including a first body and a first door, the first door movable to expose a first electrical connector disposed within the first body;
   a second connector including a second body and a second door, the second door movable to expose a second electrical connector disposed within the second body; and
   an actuator coupled to the second electrical connector, the actuator configured to move the second electrical connector to couple the second electrical connector to the first electrical connector.

2. The electrical connector system of claim 1, wherein the first body includes a first guide, the second body includes a second guide rail, and engagement of the first guide of the first body with the second guide rail of the second body is configured to move the first door and the second door to expose the first electrical connector and the second electrical connector.

3. The electrical connector system of claim 2, wherein the first guide defines a channel that receives the second guide rail, and the channel has a first cross-section at a first surface of the first body and transitions to a second cross-section a distance from the first cross-section, the second cross-section different than the first cross-section.

4. The electrical connector system of claim 1, wherein the second body includes a second receptacle, the second electrical connector is coupled to a connector housing disposed within the second receptacle and the connector housing is slidable relative to the second receptacle by the actuator.

5. The electrical connector system of claim 4, wherein the second receptacle is in communication with a second door opening defined in the second body, and the second door is configured to enclose the second receptacle in a first, closed position.

6. The electrical connector system of claim 5, wherein the second body further comprises a second spring housing that is configured to receive a second spring, and the second spring biases the second door into the first, closed position.

7. The electrical connector system of claim 4, wherein the connector housing includes a second alignment pin configured to be received within the first body when the first electrical connector is exposed.

8. The electrical connector system of claim 1, wherein the first body is configured to move the second door to expose the second electrical connector, and the second body is configured to move the first door to expose the first electrical connector.

9. The electrical connector system of claim 1, wherein the first body defines a first receptacle, the first electrical connector is disposed within the first receptacle and is fixed relative to the first receptacle, the first body defines a first door opening in communication with the first receptacle, and the first door is movable relative to the first door opening to expose the first electrical connector.

10. The electrical connector system of claim 1, wherein the first electrical connector is a female electrical connector, the second electrical connector is a male electrical connector, and the movable component and the fixed component are each associated with a vehicle.

11. A method for electrically coupling a movable component to a fixed component, comprising:
   providing a first connector including a first body and a first door coupled to the movable component, the first door movable to expose a first electrical connector disposed within the first body;
   providing a second connector including a second body and a second door coupled to the fixed component, the second door movable to expose a second electrical connector disposed within the second body;
   determining, by a processor, whether the movable component is coupled to the fixed component; and
   based on a determination that the movable component is coupled to the fixed component, outputting one or more control signals to an actuator coupled to the second electrical connector to move the second electrical connector into engagement with the first electrical connector.

12. The method of claim 11, further comprising:
   determining whether the movable component is uncoupled from the fixed component; and
   based on a determination that the movable component is uncoupled from the fixed component, outputting one or more control signals to the actuator coupled to the second electrical connector to retract the second electrical connector to disengage the second electrical connector with the first electrical connector.

13. The method of claim 11, wherein the determining whether the movable component is coupled to the fixed component further comprises:
   providing a latch on the fixed component configured to receive a striker coupled to the movable component;
   observing a state of the latch by a latch feedback sensor and generating sensor signals based on the observing; and
   determining, by the processor, whether the latch is in a latched state in which the movable component is coupled to the fixed component or an unlatched state in which the movable component is uncoupled from the fixed component based on the sensor signals.

14. The method of claim 13, further comprising:
   outputting one or more control signals to the actuator to disengage the second electrical connector with the first electrical connector based on the determining the latch is in the unlatched state.

15. An electrical connector system for electrically coupling a movable component to a fixed component, comprising:
   a first connector configured to be coupled to the movable component, the first connector including a first body and a first door, the first door movable to expose a first electrical connector disposed within the first body, the first body including a first guide disposed on a first side of the first body;
   a second connector configured to be coupled to the fixed component so as to be aligned with the first connector about a longitudinal axis that extends along the first connector and the second connector, the second connector including a second body and a second door, the second door movable to expose a second electrical connector disposed within the second body, the second body include a second guide rail defined on a second side of the second body and engagement of the first guide of the first body with the second guide rail of the second body is configured to move the first door and the second door to expose the first electrical connector and the second electrical connector; and an actuator coupled to the second electrical connector, the actuator configured to move the second electrical connector to couple the second electrical connector to the first electrical connector when the first electrical connector and the second electrical connector are exposed.

16. The electrical connector system of claim 15, wherein the first guide defines a channel that receives the second guide rail, and the channel has a first cross-section at a first end of the first body and transitions to a second cross-section a distance from the first cross-section, the second cross-section different than the first cross-section.

17. The electrical connector system of claim 15, wherein the second body includes a second receptacle, the second electrical connector is coupled to a connector housing disposed within the second receptacle and the connector housing is slidable relative to the second receptacle by the actuator.

18. The electrical connector system of claim 17, wherein the second receptacle is in communication with a second door opening defined in the second body, and the second door is configured to enclose the second receptacle in a first, closed position.

19. The electrical connector system of claim 18, wherein the second body further comprises a second spring housing that is configured to receive a second spring, and the second spring biases the second door into the first, closed position.

20. The electrical connector system of claim 15, wherein the first body defines a first receptacle, the first electrical connector is disposed within the first receptacle and is fixed relative to the first receptacle, the first body defines a first door opening in communication with the first receptacle, the first door is movable relative to the first door opening to expose the first electrical connector and the movable component and the fixed component are each associated with a vehicle.

* * * * *